March 13, 1951     E. SPAHN     2,545,390

ELECTRICAL CONTROL SYSTEM

Filed April 7, 1947

Patented Mar. 13, 1951

2,545,390

UNITED STATES PATENT OFFICE 2,545,390

ELECTRICAL CONTROL SYSTEM

Emil Spahn, Basel, Switzerland, assignor to Fr. Sauter A. G. Fabrik elektr. Apparate, Basel, Switzerland, a Swiss firm Application April 7, 1947, Serial No. 739,927
In Switzerland September 14, 1943

Section 1, Public Law 690, August 8, 1946
Patent expires September 14, 1963

2 Claims. (Cl. 318—28)

The present application relates to an extremely simple and reliable system for the electrical control of physical values, such as temperature, pressure, moisture, level and so forth, i. e. values the control of which needing a relatively high time constant of the control system. Its characteristic feature is that two electrical resistances variable with temperature are included in the circuits of a differential relay controlling a control member, and one of them is heated upon switching on the motor of the control member in one direction and the other upon switching on the motor in the other direction so that the control member is brought back to the position of rest after a determined time of operation.

Two examples of the invention are illustrated in the accompanying drawing.

Figure 1:
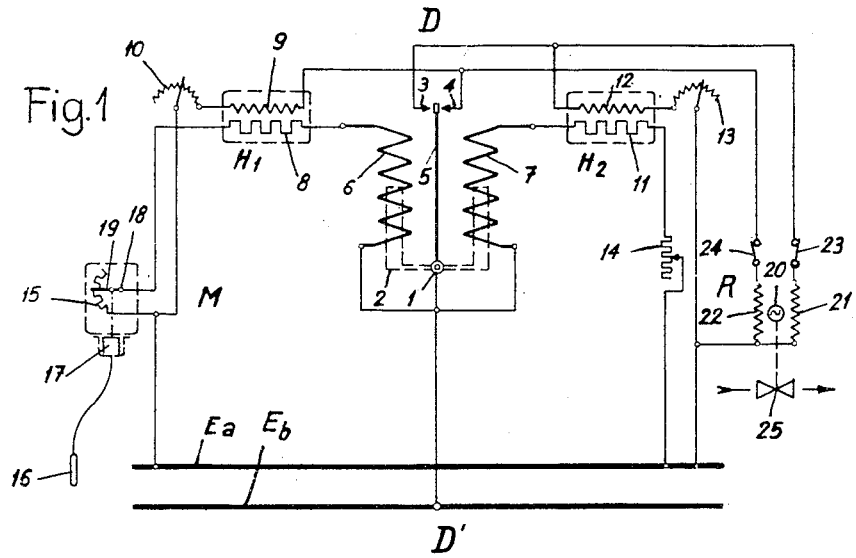
Figure 1 shows a diagram of connections for a temperature regulating installation.

In the diagram of Figure 1 M is a thermostat, D a differential relay, R a regulating value, $H_1$, $H_2$ are heating elements, $E_a$, $E_b$ are the supply mains. The differential relay D which serves as the controlling apparatus has a magnetic armature 2 pivoted at the point 1, and to this is secured a contact tongue 5 movable between two contacts 3 and 4. The armature 2 has two limbs each entering an exciting coil, 6 and 7 respectively; of these the coil 6 is in series with a resistance 8 variable with temperature and with the transmitter resistance 15 of the meter M while the winding 7 is in series with a second resistance 11 variable with temperature and an adjusting resistance 14, both circuits being connected across the mains $E_a$, $E_b$. The thermostat M includes a temperature detector 16, a resilient bellows 17 and a contact arm 19 rotatable about the point 18; the arm 19 is moved up and down in dependence upon the temperature around the detector 16. The two heating elements $H_1$, $H_2$ are heated by resistances 9, 12 the currents through which are adjustable by regulating resistances 10, 13.

The regulating valve R includes a reversible operating motor 20 which runs in the one direction or the other according as the field winding 21 or 22 is put in circuit. Limit switches 23, 24 are arranged to break the circuit of the motor when the regulating means reaches the end of its range. The actual regulating valve is indicated at 25 and may be assumed to control the flow of hot water for heating systems.

The apparatus of Figure 1 operates as follows:

When the value to be regulated, that is to say the temperature, is at the set value the armature 2 of the differential relay D is in the mid position shown in the drawing, equal currents flowing through the two exciting windings 6 and 7. The contact tongue 5 is not in contact with either of the contacts 3 and 4 and so there is no current supply to the motor of the regulating means R nor to the heating resistances 9 and 12. If the temperature around the detector 16 rises too high the resistance 15 is increased and the current in the exciting winding 6 is reduced below that in the winding 7 with the result that the tongue 5 abuts on the contact 3. This puts the motor 20 of the regulator R in action in the direction for closing the valve 25. But at the same time the heating resistance 12 of the heating element $H_2$ is put in circuit, and after a short time of heating the resistance 11 increases in value sufficiently to bring the currents in the exciting coil 6 and 7 of the differential relay again into balance whereupon the tongue 5 leaves the contact 3. So as a result of the increase in the value of the resistance 11 the regulating valve automatically comes to rest after a certain time of adjustment unless the temperature around the detector 16 is so much over the desired value that the maximum increase in the resistance 11 does not suffice to reestablish balance in the differential relay. In this case the regulating valve 25 would be moved to its end position, that is to say it would be completely closed, and the limit switch 23 would accordingly be opened. The heating resistance 12 however would remain in circuit so long as the contact 3 is closed.

If the temperature to be regulated falls below the desired value contact 4 is closed and the regulating valve 25 is opened more widely while simultaneously the heating element $H_1$ is heated.

By suitable adjustment of the resistances 10 and 13 the time of heating of, and the temperature reached by, the heating elements $H_1$ and $H_2$, and thus the extent and effectiveness of the automatic reaction can be suited to the circumstances. The characteristic of the automatic reaction may also be further affected by modification of the mass of the heating element and of its rate of cooling, that is to say of its heat insulation.

Figure 2:
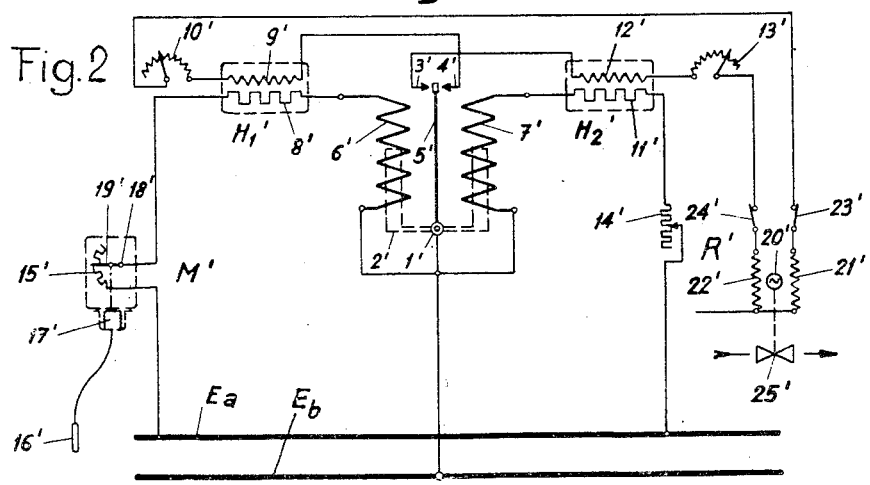
Figure 2 shows a further diagram of connections for the same purpose with the heating resistances differently connected.

The regulator of Figure 2 works on the same principle as that of Figure 1. It differs from Figure 1 inasmuch as the heating resistances 9' and 12' are not in parallel with the motor windings 21' and 22' as in Figure 1 but are in series with them. The consequence of this is that when the limit switches 23', 24' operate, they disconnect not only the motor but also the heating resistance 9' or 12'. Consequently the next shift of the regulator valve does not occur until the temperature has passed through the desired value, whereas in Figure 1 the next shift occurred earlier. In most cases the arrangement of Figure 1 is advantageous since by means of it over-regulation can be obviated.

As compared with the known regulators the control systems above described have the substantial advantage that the resistance 8 and 11 varying with temperature always return when cooled to exactly the same value which makes possible exact regulation and exact maintenance of the desired temperature. If contact brushes are shifted during the operation there is always a certain mechanical hysteresis on account of friction and so a lack of precision in the maintenance of the desired value of the quantity regulated.

Figure 3:
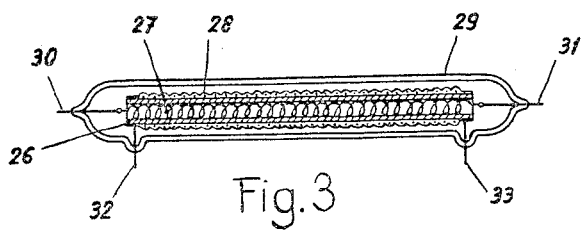
Figure 3 shows the construction of a heating element.

The heating element illustrated in Figure 3 contains an enamelled metal tube 26 in which is mounted a helically wound heating resistance 27. The resistance 28 varying with temperature is cast into the enamel on the outer surface of the tube 26. The heating resistance 27 may similarly be embedded in enamel. This ensures a good heat-conductive connection between the resistance and the metal tube. For good heat insulation the whole of the device is enclosed in a glass tube 29, the connections 30, 31 of the heating resistance and the ends 32, 33 of the resistance varying with temperature being sealed into the glass and the tube more or less evacuated. By means the heating load is reduced to a minimum and the time of cooling is prolonged.

The above described device with heated resistance elements may of course be used not only in the schemes of connections shown in Figures 1 and 2 but also in, for example, a bridge or potentiometer connection such as is usual in electrical control systems. It is in essence suitable for regulating any physical-technical quantity such as temperature, pressure, moisture, level and so forth, the constants of the heating elements and of the remaining elements of the regulator being of course adapted to the conditions.

What I claim is:

1. In an electrical control system comprising a control member and a reversible motor operating such control member, the combination with said motor of a differential relay controlling said motor and its direction of rotation, said relay having two windings and being inoperative while the currents in the two windings are equal, a resistance unit variable with temperature connected in series with each said winding, said unit comprising an evacuated glass tube, a heating element in said tube having circuit connecting ends fused in end portions of said glass tube and extending therefrom, a resistance element variable with temperature in said glass tube and having circuit connecting ends fused in said glass tube and extending therefrom, means for measuring the quantity to be regulated, a resistance controlled by said measuring means in series with one of the windings of said differential relay circuit connections to said heating elements in said units whereby said differential relay on switching on the motor also switches on the heater of the resistance variable with temperature in series with that one of said windings which carries the greater current and limit switches in the circuit of said motor for breaking the circuit thereof when said control member reaches the end of said member's operative range.

2. In an electrical control system comprising a control member and a reversible motor operating such control member, the combination with said motor of a differential relay controlling said motor and its direction of rotation, said relay comprising a pivotally mounted U-shaped magnetic armature, a contact member secured to said armature intermediate the sides thereof and extending above said armature, contact points contactable by said member and exciting coils surrounding the side members of said armature, a resistance variable with temperature connected to each said coil in series, an electric heater for each said variable resistance, each being connected to one of said contact points, means for measuring the quantity to be regulated, a resistance in series with one of said exciting coils controlled by said measuring means, and circuit connections to each said heater, said differential relay upon being activated starting said motor in one of two directions and also activating the respective heater of that resistance variable with temperature connected in series with the exciting coil carrying the greater current and limit switches in the circuit of said motor for breaking the circuit thereof when said control member reaches the end of said member's operative range.

EMIL SPAHN.

REFERENCES CITED

The following references are of record in the file of this patent:

UNITED STATES PATENTS

| Number | Name | Date |
| --- | --- | --- |
| 786,024 | Gomborow | Mar. 28, 1905 |
| 2,300,537 | Davis | Nov. 3, 1942 |
| 2,413,114 | Pontius 3d et al. | Dec. 24, 1946 |

FOREIGN PATENTS

| Number | Country | Date |
| --- | --- | --- |
| 444,673 | Great Britain | Mar. 25, 1936 |